Aug. 24, 1926.
W. G. JACKSON
1,597,276
TRANSMISSION OPERATING MECHANISM
Filed Oct. 15, 1925    3 Sheets-Sheet 2
Fig. 1.
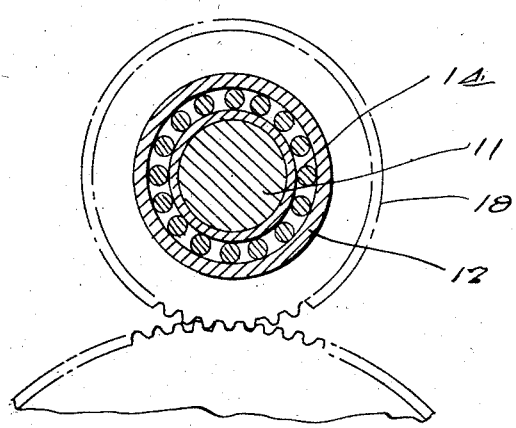
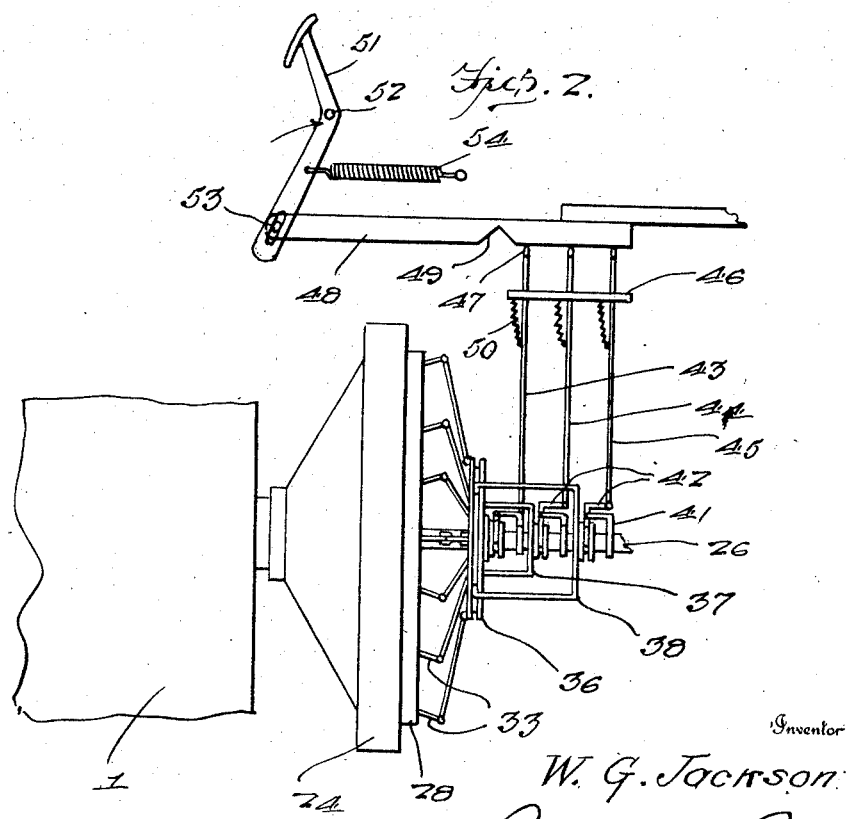
Inventor
W. G. Jackson
By Clarence A. O'Brien
Attorney Aug. 24, 1926.

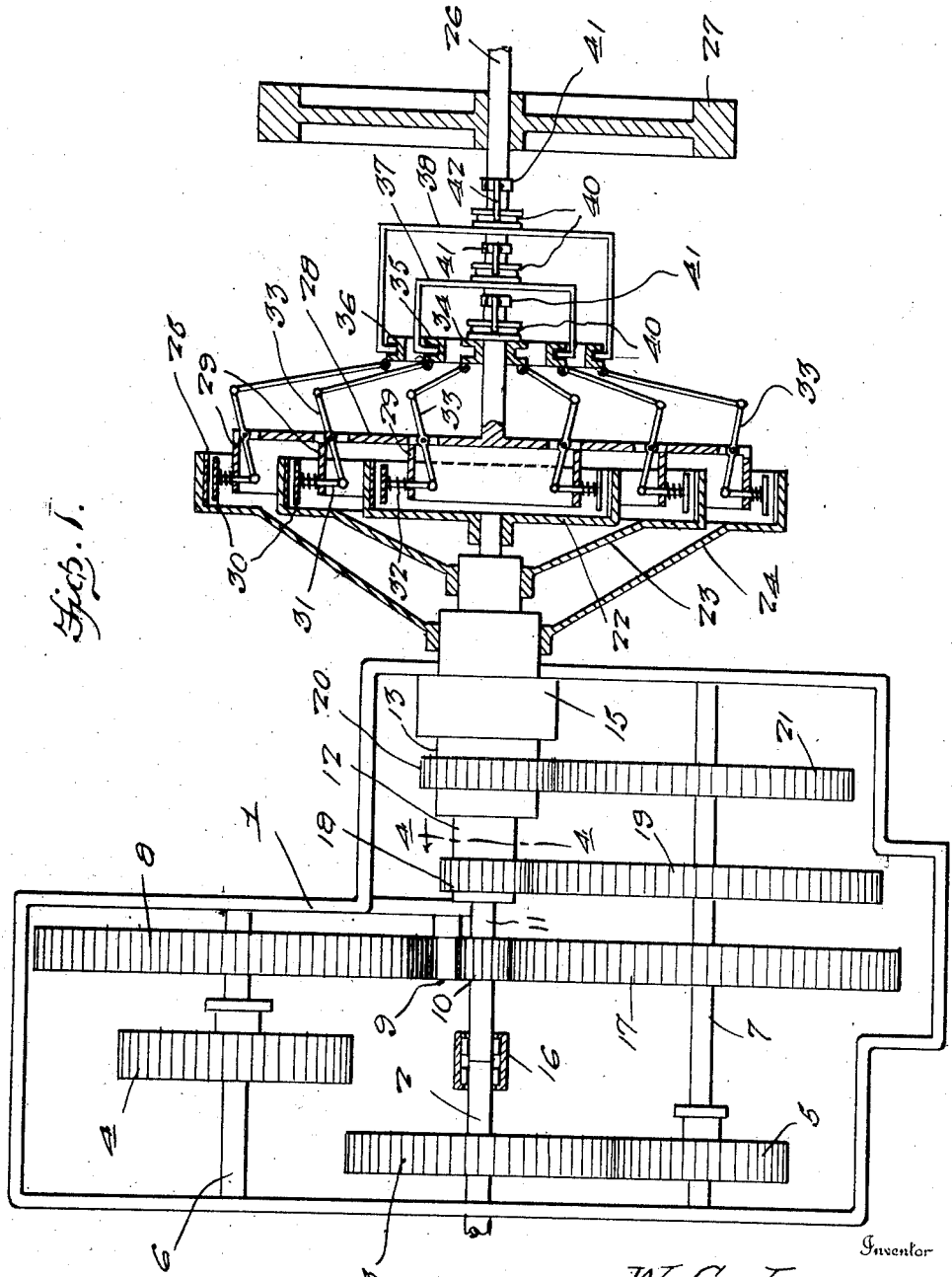

W. G. JACKSON 1,597,276

TRANSMISSION OPERATING MECHANISM

Filed Oct. 15, 1925  3 Sheets-Sheet 3

Inventor
W. G. Jackson
By Clarence A. O'Brien
Attorney

Patented Aug. 24, 1926.

1,597,276

UNITED STATES PATENT OFFICE.

WILLIAM G. JACKSON, OF EVANSVILLE, INDIANA.

TRANSMISSION-OPERATING MECHANISM.

Application filed October 15, 1925. Serial No. 62,570.

This invention relates to clutch mechanisms operable for controlling the shifting operation of a transmission so that the control of the clutches by suitable manually operated means will operate to intermesh transmission gears for driving a driven shaft from a driving shaft in any one of a plurality of different gear ratios.

An object of the invention resides in providing a variable speed transmission in which the variable speed gears are interconnected to drive a driven shaft from a driving shaft through the control manually, and operation of a plurality of independent friction clutch mechanisms alternately engaged in predetermined relation for varying the speed in accordance with the manual control of the clutches.

Another object of the invention resides in providing a variable speed transmission for driving a driven from a driving shaft controlled by suitable means operated from a single clutch pedal according to the relative position of said clutch pedal on its pivot.

The invention comprehends further objects and improvements in the details of construction and the arrangement of the parts of a gear controlling mechanism for the variable speeds as well as "reverse" which are more particularly pointed out in the following detailed description and in the claim directed to a preferred form of the invention, it being understood, however, that various changes in the construction of the details of the mechanism may be made without departing from the spirit and scope of the invention as herein set forth.

In the drawings forming part of this application:—

Figure 1 is a horizontal sectional view through the transmission and clutch control mechanism illustrating the improvements of the present invention.

Fig. 2 is a side elevation of the control mechanism showing somewhat diagrammatically the manner in which the operation and control of the clutch mechanism for the various gear ratios are operated through the manual operation of a single clutch pedal.

Fig. 4 is a sectional view taken on the line 4—4 of Fig. 1.

Figure 3:
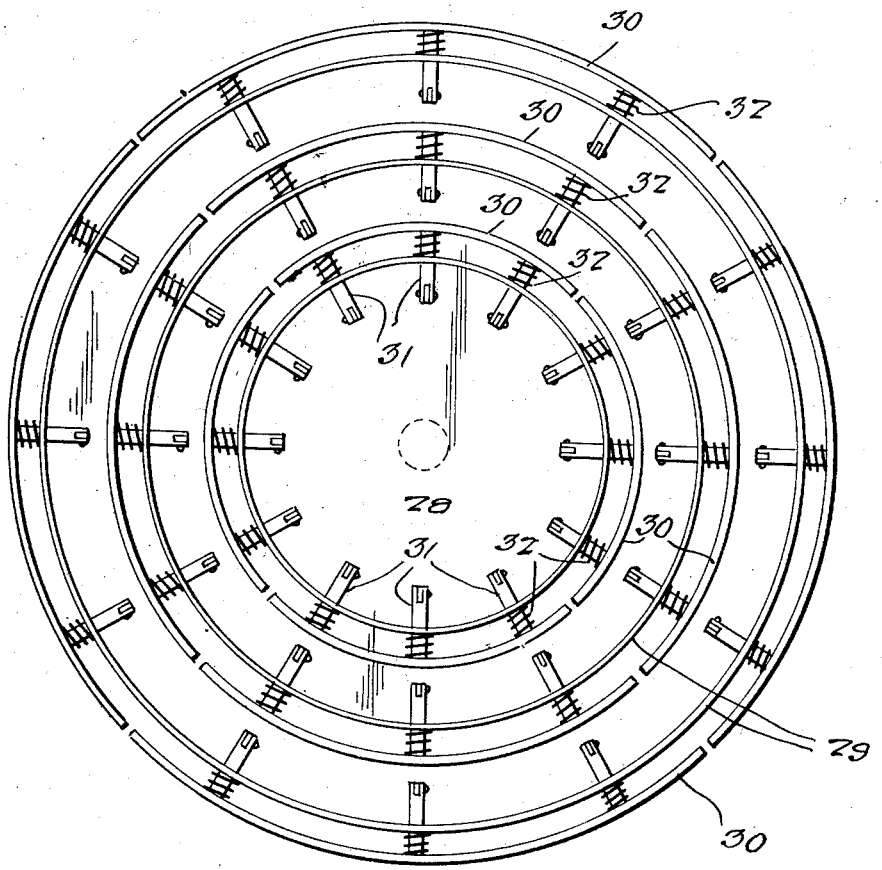
Fig. 3 is an end view of the plate member carrying the movable clutch elements, and levers connected therewith for operating said clutch elements.
Figure 5:
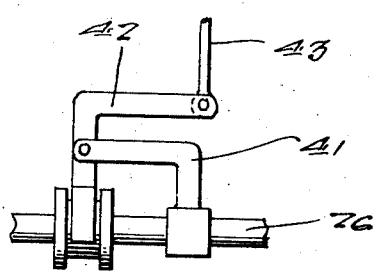
Fig. 5 is an enlarged detail view showing the manner of constructing and mounting the bell crank levers for controlling the clutch operating collars.

A transmission housing is indicated at 1 into which projects the driven shaft 2 carrying the driven gear 3 with which is adapted to intermesh the gears 4 and 5 respectively which are slidable on the counter shafts 6 and 7 respectively and adapted for alternate intermeshing engagement with the driven gear 3 through the operation of suitably manually controlled mechanism well known in the art which may be of any desired type or character. The counter shaft 6 carries a spur gear 8 which intermeshes with a reversing gear 9 and which in turn intermeshes with the low speed drive gear 10.

A plurality of supplemental drive shafts driven from a main driving shaft are mounted in concentric relation and indicated at 11, 12 and 13 forming the drive shafts for low, intermediate and high speed respectively. The assembled shafts which are provided with roller bearings between one another as illustrated in Fig. 4 at 14, are mounted in a bearing 15 carried by the casing 1, while the end portion of the shaft 11 within the transmission housing is provided with a bearing 16 mounted on the end of said shaft and the end of the driven shaft 2, so as to hold the supplemental driving and driven shafts in alinement. The low speed gear 10 is mounted on the shaft 11 and serves to drive the reverse gear 9 for providing reverse motion of the driven shaft 2, through intermeshing engagement of the gear 4 with the gear 3. This low speed gear 10 also drives the spur gear 17 mounted on the counter shaft 7 so that when connected in driving relation with the power shaft, the driven gear will be driven at a low speed ratio with respect to the driving shaft.

A gear 18 is mounted on the supplemental drive shaft 12 rotatable relative to the shaft 11 and 13 and respectively, and meshes with the spur gear 19 on the shaft 7 for providing an intermediate speed ratio for driving the driven shaft from the driving shaft. The gear 20 on the supplemental drive shaft 13 drives the spur gear 21 on the shaft 7 to produce a high speed ratio.

Mounted on the supplemental drive shafts 11, 12 and 13 respectively are a plurality of drums 22, 23, and 24 respectively, provided with annular clutching surfaces in concentric relation as indicated at 25.

A main drive shaft 26 carries a fly wheel 27 and is driven from a suitable form of a power generating mechanism such as an internal combustion engine or the like, and on the end portion of the said main drive shaft is mounted an annular supporting disk 28 having a plurality of concentric annular flanges 29 arranged in predetermined spaced relation thereon, and projecting from one side thereof.

A plurality of arcuate movable clutching members are indicated at 30 which are arranged to form three groups of concentrically arranged sets of clutches for engagement with the clutching faces 25 in a manner which will be presently described. These clutch members are mounted on suitable rod members 31 which project through openings in the flanges 29 and through the operation of the compression spring 32 are normally projected for engagement with the clutching faces 25 of the drum. A plurality of groups of levers 33 are pivotally mounted intermediate their ends in the supporting disk 28 and have one end connected to the inner ends of the rods 31 so that upon the operation of any one of the groups of levers the clutch members for controlling driving connection between the main drive shaft and one of the supplemental drive shafts may be permitted or controlled in a desired manner.

A plurality of operating members are indicated at 34, 35 and 36 respectively which are arranged in concentric spaced relation and adapted for rotation with and sliding movement on the main drive shaft 26, the operating collars 35 and 36 being carried by suitable supporting members 37 and 38 respectively, which are slidably mounted on said shaft 26, while all of these operating members are provided with annular grooved collar portions 40 slidable on the shaft 26. A plurality of pivot members 31 are rigidly mounted in spaced relation on the shaft 26, one being associated with each of the collars 40 for pivotally supporting the bell crank levers 42 having forked ends engaging in the grooves of the respective collars.

A plurality of control levers 43, 44 and 45 are connected with the end of the bell crank levers controlling the respective collars for the low, intermediate, and high speeds of the transmission through the control of the supplemental drive shaft.

The upper ends of these levers are guided in the plate 46 while the upper terminals 47 thereof ride against the under side of the control bar 48 provided with the V-shaped cut out or notch 49 through the operation of the tension spring 50 connected with the plate 46 and the respective control rods for maintaining the rods in the raised position. This control bar 48 is mounted for sliding movement in any suitable manner and is adapted for operation by a clutch pedal 51 pivotally mounted intermediate its ends at 52 and having the lower end provided with a pin and slot connection 53 with the control bar 48.

From the above description it will thus be seen that the control rods 43, 44, and 45, together with the bell crank levers, the pivot member and the supports 37 and 38 do not rotate with the shaft 26 while the collars 40 and the control members 34, 35 and 36 do rotate with this shaft and are controlled by the sliding movement occasioned by the operation of the bell crank levers for governing the engagement of the respective sets of concentric sets of clutch members with the drum for transmission of power between the drive and driven shafts.

The tension spring 54 normally tends to move the control bar 48 from the position shown in Fig. 2 so that the notch 49 will be moved beyond the upper end of the control rod 45. Thus, when it is desired to start a motor vehicle with this transmission construction, the clutch pedal 51 is operated to move the control bar 48 into the position shown in Fig. 2 following which the mechanism for controlling a shifting of the gears 4 and 5 is operated to intermesh the gear 5 with the driven gears 3 so that a subsequent gradual release of manual operation on the clutch pedal 51 will permit the movement of the control bars 48 so that the control rod 43 will slide upwardly within the recess or notch 49 therein for connecting the low speed gear on the supplemental shaft 11 with the main drive shaft 26 through the operation of the group of levers controlling the inner group of clutch bands 30 by permitting them to engage the inner periphery of the drum 22. This drives the driven shaft 2 in low speed and when it is desired to shift to the next higher gear ratio which is an intermediate speed the clutch lever 51 is further released permitting the movement of the control bar so that the control rods 44 will rise upwardly in the nuts 49 thereof. This permits the operation of the control collar 35 and through operating the group of levers connected by the link mechanism therewith the intermediate set of clutch members are permitted to engage the inner periphery of the drum 23 which drives the shaft 12 and the intermediate gears 18 for decreasing the gear ratio between the driving and driven shafts and driving the vehicle in a well known manner. When it is desired to drive the driven shaft 2 at high speed, the manual operation of the clutch lever 51 is permitted by releasing the pressure on the clutch pedal and permitting the further movement of the control bar under the action of the spring 54 so that the notch 49 will move over the end of the control rod 45 and permit the upward movement in said notch.

The control bar may be limited by suitable means for preventing further movement under the action of the spring 54 beyond this point so that the release of the clutch pedal will hold the operating mechanism in the high speed position for permitting the outer group of clutch to engage the inner periphery of the drum 24 and drive the shaft 13, the gear 20, the gear 21, transmitting a substantially direct drive between the main drive shaft 26 and the driven shaft 2.

Should it be desired to reverse the motion of the vehicle and the driven shaft, it is to be understood that the clutch pedals 15 may be operated to move the parts into the position shown in Fig. 2, following which the control mechanism for the gears 4 and 5 is operated to disengage the gear 5 from the gear 3 and engage the gear 4 with the driven gear 3, where after the release of the clutch pedal to permit the motion of the control bar for allowing the rod 43 to move upwardly in the recess 49 will drive the reverse gear 9 from the low speed gear 10 so that reverse motion is imparted to the driven shaft.

From the above description it will thus be appreciated that a transmission controlling and operating mechanism has been provided which will operate and control the operation of the transmission by a single lever which will permit the driving of the vehicle at different speed ratios through the operation of the single lever and which eliminates the necessity for the usual clutch.

Having thus described my invention, what I claim as new is:—

A device of the class described comprising a transmission having variable speed driving mechanism, a driven shaft driven by said transmission mechanism, a plurality of concentric supplemental drive shafts independently operable for driving said transmission mechanism at variable speeds, a plurality of drums mounted in concentric relation, one on each of said supplemental drive shafts, a main drive shaft, a supporting member mounted on said main drive shaft, a plurality of groups of clutching members on the supporting member and operated to engage the concentric drums on said supplemental drive shafts, operating means for controlling the engagement of said clutching means with said drums, and control means manually operable from a single lever for permitting engagement of one of said clutching means with one of said drums alternately with the other clutching means in a predetermined manner for transmitting power from said main drive shaft to predetermined of the supplemental drive shafts.

In testimony whereof I affix my signature.

WILLIAM G. JACKSON.